US010877723B2

(12) United States Patent
Rakshit (10) Patent No.: US 10,877,723 B2
(45) Date of Patent: Dec. 29, 2020

(54) PERSPECTIVE-BASED DYNAMIC AUDIO VOLUME ADJUSTMENT

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/598,450

(22) Filed: Oct. 10, 2019

(65) Prior Publication Data

US 2020/0042282 A1 Feb. 6, 2020

Related U.S. Application Data

(63) Continuation of application No. 15/414,120, filed on Jan. 24, 2017, now Pat. No. 10,592,199.

(51) Int. Cl.
*G06F 3/16* (2006.01)
*G11B 27/031* (2006.01)

(52) U.S. Cl.
CPC ............ *G06F 3/165* (2013.01); *G11B 27/031* (2013.01)

(58) Field of Classification Search
None
See application file for complete search history.

(56) References Cited

U.S. PATENT DOCUMENTS

| | | | |
|---|---|---|---|
| 9,210,503 B2 | 12/2015 | Avendano et al. | |
| 9,240,213 B2 | 1/2016 | Gerstlberger et al. | |
| 9,716,943 B2 | 7/2017 | Laaksonen et al. | |
| 9,826,331 B2 | 11/2017 | Wu et al. | |
| 10,200,804 B2 | 2/2019 | Chen et al. | |
| 2003/0118192 A1 | 6/2003 | Sasaki | |
| 2004/0110561 A1 | 6/2004 | Kawamura | |
| 2005/0099511 A1 | 5/2005 | Cazier | |

(Continued)

OTHER PUBLICATIONS

YouTube, LATimesTrailers, "The Foley Artist: Los Angeles Times", [retrieved on Aug. 9, 2016]. Retrieved from the Internet <URL: https://www.youtube.com/watch?v=UNvKhe2npMM>, uploaded Dec. 3, 2008, 4 pgs.

(Continued)

*Primary Examiner* — Gelek W Topgyal
(74) *Attorney, Agent, or Firm* — Michael O'Keefe; Matthew M. Hulihan; Heslin Rothenberg Farley & Mesiti PC (57) ABSTRACT

Perspective-based dynamic audio volume adjustment. A method obtains multimedia content, the multimedia content including video frames of a scene and audio content for playing in conjunction with display of the video frames. The audio content includes audio portions corresponding to objects in the scene. Based on a selection of a viewing perspective from which to view the scene, the method determines an audio mix for the audio portions given the selected viewing perspective. Determining the audio mix includes determining, for each object of the objects in the scene, a respective audio volume level for an audio portion, of the audio portions, corresponding to the object. The respective audio volume level is based at least in part on a position of the object relative to the selected viewing perspective.

19 Claims, 7 Drawing Sheets

(56) References Cited

U.S. PATENT DOCUMENTS

| | | |
|---|---|---|
| 2010/0014693 A1 | 1/2010 | Park et al. |
| 2010/0111336 A1 | 5/2010 | Jeong et al. |
| 2010/0328423 A1 | 12/2010 | Etter |
| 2012/0050491 A1 | 3/2012 | Seshadri et al. |
| 2012/0163625 A1 | 6/2012 | Siotis et al. |
| 2012/0224700 A1 | 9/2012 | Nakagawa et al. |
| 2012/0281128 A1 | 11/2012 | Shintani |
| 2013/0342731 A1 | 12/2013 | Lee et al. |
| 2014/0334630 A1 | 11/2014 | Harel |
| 2014/0348342 A1 | 11/2014 | Laaksonen et al. |
| 2014/0369506 A1 | 12/2014 | Arrasvuori et al. |
| 2015/0131966 A1 | 5/2015 | Zurek et al. |
| 2016/0080684 A1 | 3/2016 | Farrell et al. |
| 2016/0227337 A1 | 8/2016 | Goodwin et al. |
| 2017/0339507 A1 | 11/2017 | Hsu |
| 2017/0374486 A1 | 12/2017 | Killham et al. |
| 2018/0046874 A1 | 2/2018 | Guo et al. |
| 2018/0109900 A1* | 4/2018 | Lyren .................. H04S 7/304 |
| 2018/0210697 A1 | 6/2018 | Rakshit |
| 2018/0203509 A1 | 7/2018 | Yamano et al. |
| 2019/0108683 A1 | 4/2019 | Valli et al. |

OTHER PUBLICATIONS

Wikpedia, "Foley (filmmaking)", [retrieved on Aug. 9, 2016]. Retrieved from the Internet <URL: https://en.wikipedia.org/wiki/Foley_%28filmmaking%29>, 4 pgs.

"Tutorial 28: Audio Control of Video", [retrieved on Aug. 9, 2016]. Retrieved from the Internet <URL: https://docs.cycling74.com/max5/tutorials/jit-tut/jitterchapter28.html>, 6 pgs.

Resner, Ken, E-Learning Heroes, "Audio Volume Control for Videos . . . Where? How?" [retrieved on Aug. 9, 2016]. Retrieved from the Internet <URL: https://community.articulate.com/discussions/articulate-storyline/audio-volume-control-for-videos-where-how>, 3 pgs.

"Adjusting audio and video—OpenTok docs", [retrieved on Aug. 9, 2016]. Retrieved from the Internet <URL: https://tokbox.com/developer/guides/audio-video/js/>, 5 pgs.

"Loudness of a Sound", [retrieved on Aug. 9, 2016]. Retrieved from the Internet <URL: http://lokar.fmf.uni-lj.si/www/osebno/logarithm/worksheets/sound.htm>, 3 pgs.

Tunes Preview, "EasyMeasure—Measure with your Camera!", [retrieved on Aug. 9, 2016]. Retrieved from the Internet <URL: https://itunes.apple.com/in/app/easymeasure-measure-your-camera!/id3495301057mt=8~>, 4 pgs.

GooglePlay, "Smart Measure", [retrieved on Aug. 9, 2016]. Retrieved from the Internet <URL: https://play.google.com/store/apps/details?id=kr.sira.measure&hl=en>, updated Apr. 19, 2016, 5 pgs.

"Sound intensity I and the inverse square law $1/r^2$", [retrieved on Aug. 9, 2016]. Retrieved from the Internet <URL: http://www.sengpielaudio.com/calculator-squarelaw.htm>, 11 pgs.

Saxena, Ashutosh, et al. "3-D Depth Reconstruction from a Single Still Image", [retrieved on Aug. 9, 2016]. Retrieved from the Internet <URL: http://www.cs.cornell.edu/~asaxena/learningdepth/ijcv_monocular3dreconstruction.pdf Computer Science Department, Stanford University, CA, 16 pgs.

Narayana, Manjunath. "Automatic Tracking of Moving Objects in Video for Surveillance Applications", [retrieved on Aug. 9, 2016]. Retrieved from the Internet <URL: http://vis-www.cs.umass.edu/~narayana/NarayanaMastersThesis.pdf>, submitted to the Department of Electrical Engineering & Computer Science and the Faculty of the Graduate School of the University of Kansas, Jul. 18, 2007, 134 pgs.

Wikipedia, "Multiview Video Coding", [retrieved on Aug. 9, 2016]. Retrieved from the Internet <URL: https://en.wikipedia.org/wiki/Multiview_Video_Coding>, 4 pgs.

Main Concept, MVC/3D, "Video Codecs", [retrieved on Aug. 9, 2016]. Retrieved from the Internet <URL: http://www.mainconcept.com/eu/products/sdks/codec-sdk/video/mvc3d.html>, 6 pgs.

Mell, Peter, et al., "The NIST Definition of Cloud Computing", NIST Special Publication 800-145, Sep. 2011, Gaithersburg, MD, 7 pgs.

List of IBM Patents or Applications Treated as Related, Oct. 10, 2019, 2 pgs.

* cited by examiner

PERSPECTIVE-BASED DYNAMIC AUDIO VOLUME ADJUSTMENT

BACKGROUND

During the filmmaking process, video is captured along with audio produced by the objects being filmed. Often times, the captured audio content is augmented to enhance the viewer experience. Foley refers to sound effects that are added in post-production to enhance the audio accompanying the captured video. Foley enhancements are typically, though no always, directed to ambient sounds of the video scenes and are usually a reproduced sound of the action or object depicted, such as the sound of a door closing or waves crashing in the background of the scene. The skill of the Foley artist may be a significant factor in the quality of the Foley produced. The Foley artist typically watches the movement of the sound-generating objects on the captured video and times the reproduction of sound(s) to correlate properly with object movement. This approach has drawbacks.

SUMMARY

Shortcomings of the prior art are overcome and additional advantages are provided through the provision of a computer-implemented method. The method obtains multimedia content. The multimedia content includes video frames of a scene and audio content for playing in conjunction with display of the video frames. The audio content includes audio portions corresponding to objects in the scene. A selection of a viewing perspective is made from a plurality of viewing perspectives available from which to view the scene. Based on the selection of the viewing perspective, the method determines an audio mix for the audio portions given the selected viewing perspective. The determining the audio mix includes determining, for an object of the objects in the scene, an audio volume level for an audio portion, of the audio portions, corresponding to the object.

Further, a computer program product including a computer readable storage medium readable by a processor and storing instructions for execution by the processor is provided for performing a method. The method obtains multimedia content. The multimedia content includes video frames of a scene and audio content for playing in conjunction with display of the video frames. The audio content includes audio portions corresponding to objects in the scene. A selection of a viewing perspective is made from a plurality of viewing perspectives available from which to view the scene. Based on the selection of the viewing perspective, the method determines an audio mix for the audio portions given the selected viewing perspective. The determining the audio mix includes determining, for an object of the objects in the scene, an audio volume level for an audio portion, of the audio portions, corresponding to the object.

Yet further, a computer system is provided that includes a memory and a processor in communications with the memory, wherein the computer system is configured to perform a method. The method obtains multimedia content. The multimedia content includes video frames of a scene and audio content for playing in conjunction with display of the video frames. The audio content includes audio portions corresponding to objects in the scene. A selection of a viewing perspective is made from a plurality of viewing perspectives available from which to view the scene. Based on the selection of the viewing perspective, the method determines an audio mix for the audio portions given the selected viewing perspective. The determining the audio mix includes determining, for an object of the objects in the scene, an audio volume level for an audio portion, of the audio portions, corresponding to the object.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein as facilities for perspective-based dynamic audio volume adjustment. Because the Foley process described above is so dependent on the skills of the particular Foley artist, different Foley artists produce different final products of differing quality. Described herein are aspects including software that perform video frame image analysis on video frames of a scene to find comparative positions of different objects in the scene, and accordingly adjusts the respective audio volume level of the audio fragments corresponding to the sound-generating objects. In particular embodiments, a process obtains multimedia content including information indicating relative distances between objects and other details, then leverages these to determine and adjust an audio mix (e.g. mix of volume levels for various audio portions of the scene). In some examples, a user makes a selection of a viewing perspective from which to view the scene. The viewing perspective refers to the perspective (position, angle, etc.) from which the video elements of the scene are presented on the display. This is different from the viewing position and angle of the viewer in the physical space in which the viewer and the display device sit. The viewing perspective for a live concert event might be a particular position in the arena from which the scene is displayed. A camera may be situated at that physical location, for example, and shoot the scene with no zoom applied, to virtually position the viewer at that position in the arena. As another example, if the camera zooms in or the user applies a zoom to the display device, this may be regarded as a change in viewing perspective, i.e. to virtually reposition the viewer to a position in the arena closer to the object. This is distinct from the positioning of the user in the physical space in which the user and the display are located.

According to aspects described herein, the audio mix may be tailored to the selected viewing perspective. That is, volume levels of different objects may be modified, for instance to make more prominent the audio corresponding to objects that are in the foreground of the scene relative to the audio corresponding to objects that are in the background of the scene, all dependent on the selected viewing perspective.

In particular examples, video analysis processing identifies comparative position and distances of different objects (that generate sound) across video frames of a scene. Processing determines changes in comparative position and distance of the objects relative to each other from one frame to another frame of the scene. During Foley activity, the loudness factors of the audio portions corresponding to each sound-generating object can be adjusted automatically (i.e. the Foley artist need not tailor the volume levels manually), based on the comparative position and distance. This can be repeated for multiple scenes of the multimedia content.

Software installed on a television or other display system such as a computer system of, or in communication with, a television or other display device for multimedia playback can track the viewing perspective that a user has selected (manually or automatically via a default or other setting) to view the multimedia content. An example viewing perspective is the zoom level at which the user views the on the display. Accordingly, based on the displayed content given the selected zoom level, software can filter-out or attenuate audio portions corresponding to object(s) that are not displayed on the display for the selected viewing perspective, and can determine and provide an appropriate audio volume for each of the audio portions that are to be delivered as part of the audio mix, for instance the audio portions corresponding to objects visible on the display. In a particular example, the loudness of an object's sound included in the audio mix may be automatically increased if the viewing perspective is one that zooms-in on the object.

As an example, a video analysis engine determines resultant loudness (audio volume levels) for any multiple media content or video section, such as a scene, based on one or more of:

(i) a number of objects contributing to the generated sound—at a given distance away from a given viewing perspective, the loudness of a group of 100 screaming birds would be louder than a group of only 5 birds, and louder than a single horse;

(ii) actual or inherent loudness of the object—at a given distance away from a given viewing perspective, each sound generating object has an approximable inherent loudness. The sound of a single horse neighing from 10 feet away is relatively loud and the sound of a small bird chirping from 10 feet away is relatively soft. An average or implied decibel level can also be associated with objects and provided/maintained in a library or other database of loudness values for different objects.

(iii) comparative distance between objects—Loudness of an object decreases as the object moves farther from the viewing perspective from which to view the scene. If the viewing perspective is a position 10 feet from a train, the loudness will be much greater than if the viewing perspective were 500 feet from the train. Loudness of different objects relative to each other will vary with a comparison of their distances to the viewing perspective. The loudness of a group of 10 birds 500 meters away from a single horse positioned 10 feet from the viewing perspective will be relatively low compared to the loudness of the single horse.

Multi-video viewing mode or multiple-view video content provides multiple different viewing perspectives—that is, user-selectable options for the angle/direction from which to view a scene. Often times a scene is simultaneously shot with multiple cameras from different camera angles. This approach is used in three-dimensional video production. A result is that a same object will have different depths in the field of view of different perspectives. A particular object in the background from one angle might be in the foreground from another angle. Accordingly, the comparative position and distance of the objects relative to the viewing perspective will change depending on what viewing perspective is selected. Aspects described herein can dynamically change the loudness of the audio portions corresponding to the different objects based on the selected viewing perspective, which corresponds to a specific set of comparative distance and positions for the objects.

Figure 1:
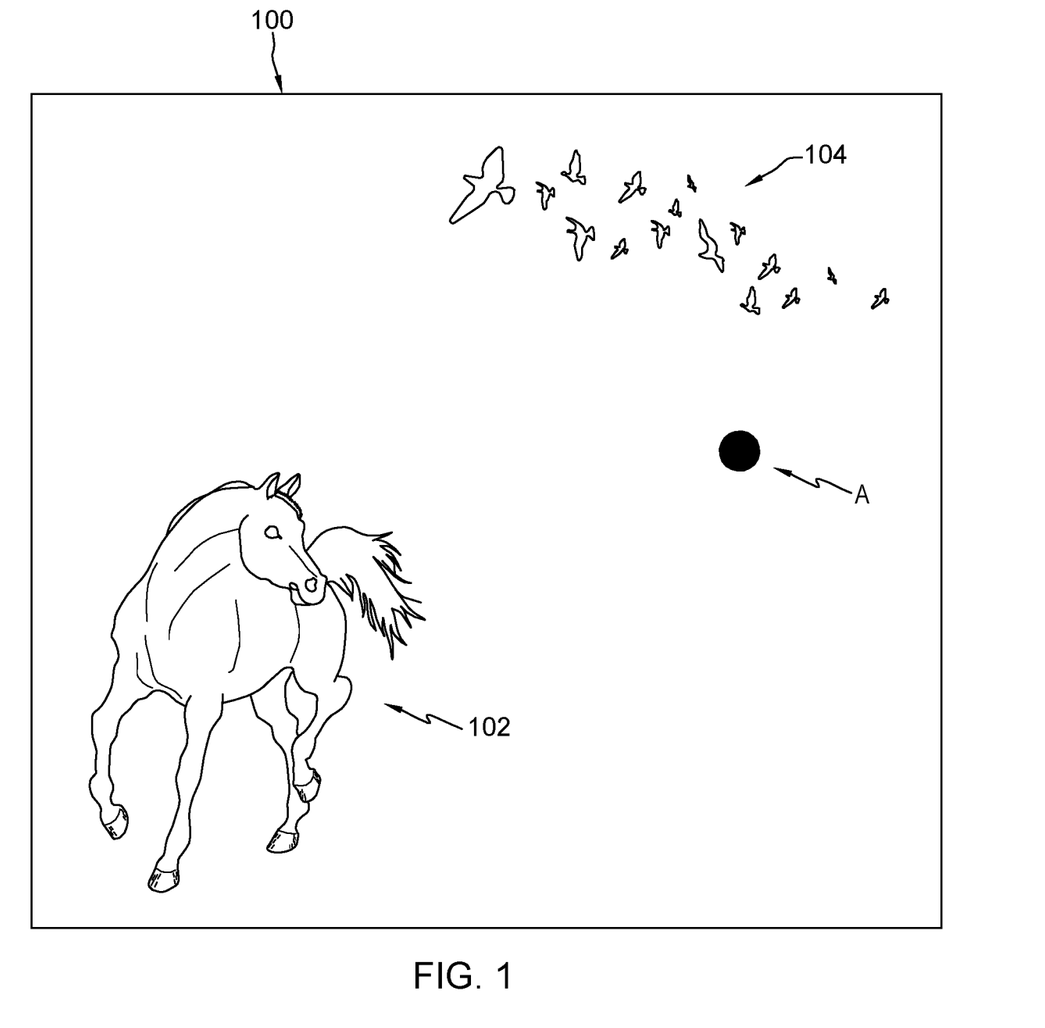
FIG. 1 depicts an example video frame of a scene from multimedia content.

FIG. 1 depicts an example video frame of a scene from multimedia content, and is used to illustrate comparative distance and position of the objects shown. The video frame 100 depicts a scene with a horse 102 in the foreground and a flock of birds 104 in the background. In this example, the birds are 500 meters away from the horse and the horse is 10 feet away from the viewing perspective. The distance between the camera system shooting the scene and the objects of the scene, including the horse 102 and birds 104, may be measured automatically, for instance by the camera system. Angular position of the objects relative to the camera may also be measured. The camera system or another system can use the measured values to determine comparative distance between the horse and the birds. Both the birds 104 and horse 102 may have corresponding audio portions that contribute to the audio mix for the scene. Assume initially that the loudness of the horse is significantly greater than the loudness of the birds. It may be that the flock of birds 104 produces a higher decibel sound than the single horse 102, however because the birds are 500 meters away from the horse, their loudness will actually be much lower than that of the horse. This can all be determined dynamically and automatically, during multimedia playback for instance. Then as the comparative distance of the sound-making objects 102 and 104 changes from one frame to another frame of the scene, a computer system can automatically determine a new audio mix, i.e. volume levels for the objects based on the changed comparative distance across the frames. For instance, if the scene involves the birds 104 flying toward the viewing perspective, their loudness may become greater relative to that of the horse 102.

Figure 2:
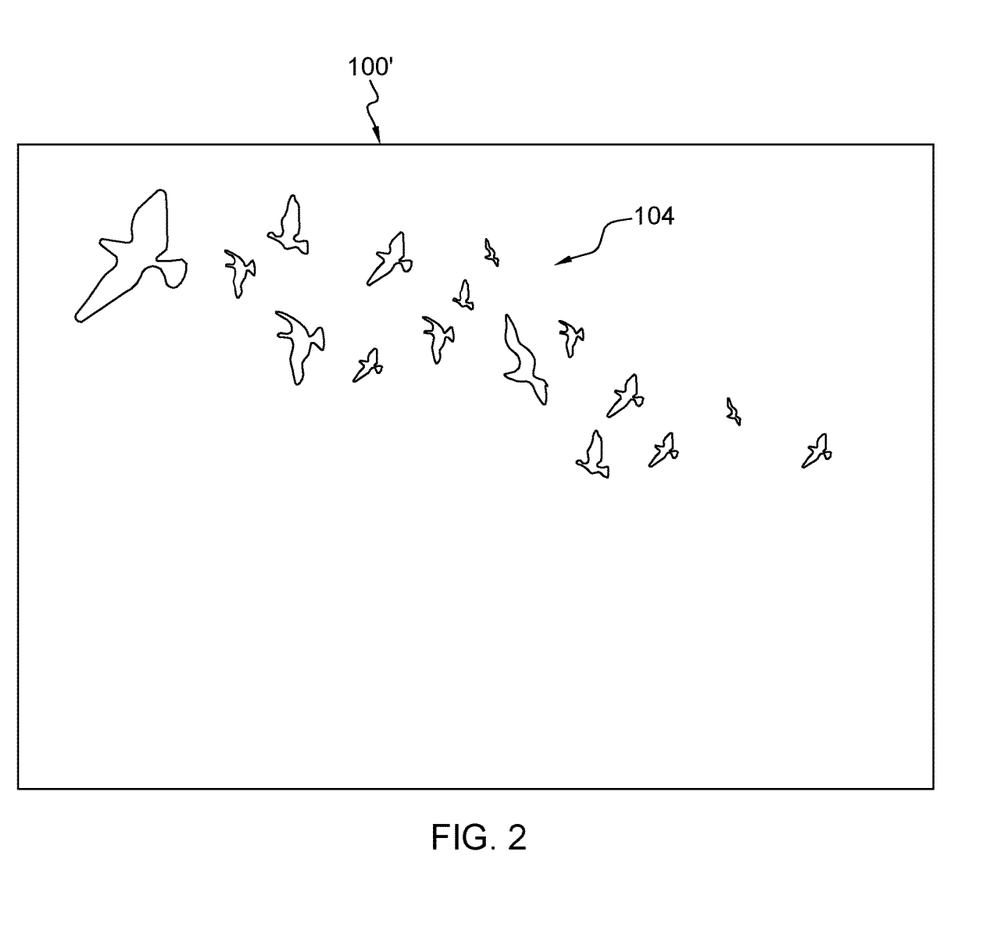
FIG. 2 depicts an example alternate viewing perspective for viewing the scene of FIG. 1.

FIG. 2 depicts an example alternate viewing perspective for viewing the scene of FIG. 1. Specifically in this example the user has activated a zoom feature for the video content that zooms the viewing perspective to point A (see FIG. 1) so that only the birds are visible in the frame 100' on the display. This may be considered a virtual repositioning of the viewer closer to the birds 104, placing the horse outside of the display area. In some examples, the audio portion corresponding to the horse is muted, omitted, or attenuated such that the audio mix will not include the sound of the horse or will attenuate that sound. In contrast, based on the zoomed-in viewing perspective, the birds 104 are situated at a closer distance to the position of the selected viewing perspective relative to the non-zoomed perspective from FIG. 1. The volume of the audio portion corresponding to the birds (their screaming for example) may be increased accordingly.

The zoom in this example virtually changes the position from which the scene is being viewed and simulates a closer distance to the birds than a full-frame perspective. The user has zoomed herself past the horse 102 and closer to the birds 104 in this example. The loudness of the horse 102 (now positioned behind the viewing perspective) and birds 104 as delivered by their audio portions may be adjusted accordingly.

Multiple audio streams or portions (collectively "audio content") can be included in multimedia content including a video file. This is often done by capturing the audio when shooting the video scene and adding or modifying audio portions during post production. Audio portions may be stored as different audio layers of the multimedia content and mapped to the appropriate object(s) of the scene, in some examples. For instance, if there are five sound-generating objects for a frame or across frames of a scene, there may be five audio layers—a respective layer for the audio portion for each of the five objects.

Cameras can measure the distance and angular position of objects being shot. This information may be used to determine distances between the camera and those objects, as well as the distances between those objects. Additionally, this information, which may be in the form of metadata, may be leveraged when different viewing perspectives are selected. If the position of a selected viewing perspective is 50% closer to an object than the camera position from which the scene was shot, the distance between the object and the selected viewing perspective may be determined to be half of the distance between the camera and the object as indicated in the metadata.

Figure 3:
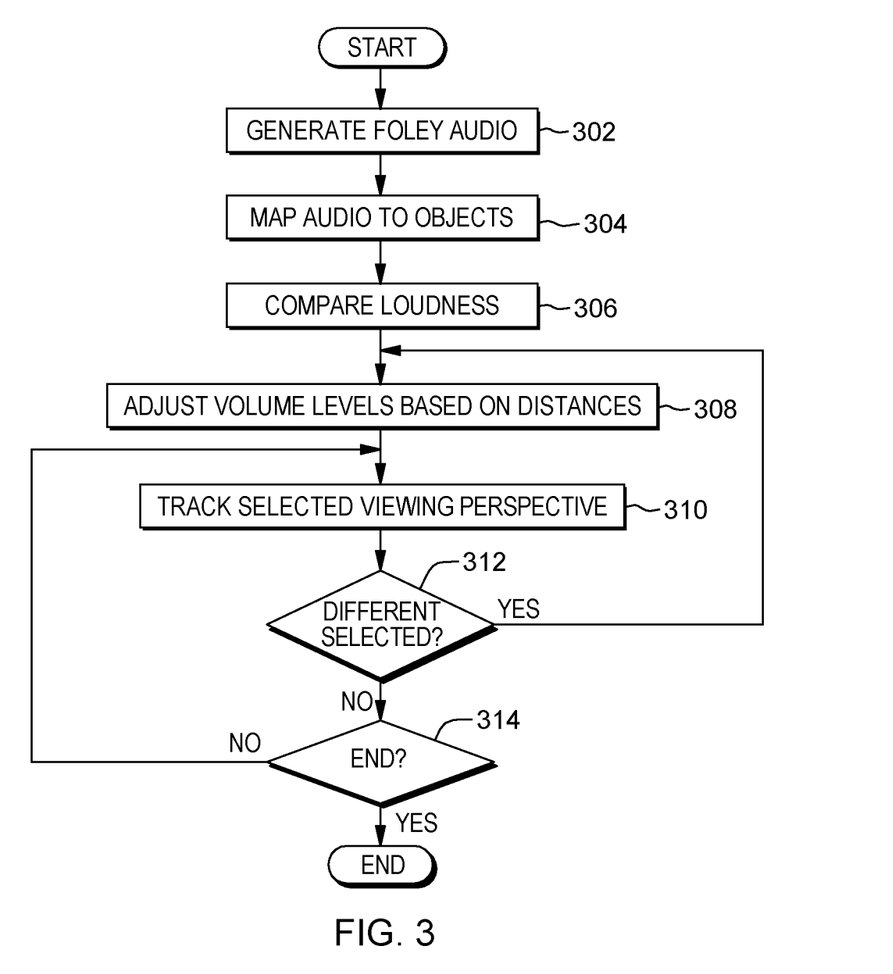
FIG. 3 depicts an example process for audio creation and handling for multimedia content, in accordance with aspects described herein.

FIG. 3 depicts an example process for audio creation and handling for multimedia content, in accordance with aspects described herein. Initially, after a video sequence has been obtained, one or more Foley artists generate audio to correspond to object(s) of the video sequence (302). Software can automatically map the acquired audio to the different objects of the video sequence (304), for instance based on audio information validation from a knowledgebase. For example, if the Foley artist records a door closing when viewing a scene in which a door closes, software may be able to map that audio to the door object in the scene. Alternatively, the mapping may be done by the Foley artist identifying that the audio is to correspond to the door object.

The process continues with a video analysis engine receiving the audio generated by the Foley artist and comparing a baseline loudness of the object with the loudness of the audio generated by the Foley artist (306) for the distance of the object. The video editing software can use a knowledgebase of baseline audio volume levels of different objects. This original or baseline loudness can be for a baseline or standardized distance, such as 3 meters. The audio volume of the audio portion recorded by the Foley artist may not be the appropriate volume of the audio from the generating object, especially considering that the volume for the object may be different for different viewing perspectives. As noted previously, the distance between the camera and objects in the scene can be detected during shooting the scene, or in any other way desired. Software can automatically adjust the audio volume level of a respective audio portion based on the distance to the object (308). If the object is 6 meters from the camera, the audio volume level of the Foley (or other sound) generated by the object can be calculated based on the baseline volume from the database. Thus, the Foley artist need not precisely control the loudness of each audio volume portion that the artist records. Loudness can also be adjusted relative to the audio generated by other objects in the scene. The volume of a bird chirping may be very low relative to the volume a running engine.

The determination of the audio volume levels of the audio portions corresponding to the objects of the scene (308) can be determined during post production, for instance at the time of, or after, Foley audio production. This may be done on a perspective-by-perspective basis in some examples. For instance, a default or first set of audio volume levels may be determined based on object distances as measured from the camera when shooting a scene. These may be stored as metadata or other content related to the multimedia content. If the multimedia includes a perspective from one or more other angles, respective one or more sets of audio volume levels may be determined based on object distances measured from the alternative cameras, and saved. Alternatively, positions of the objects in space may be ascertained during shooting, which would enable the determination of distances between the objects and any viewing perspective desired.

Additionally or alternatively, the determination of the audio volume levels of the audio portions corresponding to the objects of the scene (308) can be determined during playback if desired, for instance based on a selected viewing perspective. In this manner, the audio mix may be determined dynamically instead of, for instance, hard-coded or stored as part of the multimedia content itself.

As noted, image object depth may be stored as metadata. In one example, image object depth is stored as metadata of a video file by way of a table or other data structure that associates each image object with a corresponding depth profile indicating the depth of the object relative to the viewing perspective, across a period of time or sequence of video frames. In one example, during post production when the process augments multimedia with recorded audio portions, such as Foley, the process can adjust sound intensity based on the object depth. For instance, a video analysis engine can consider this information, and the comparative distance and position of the relevant objects in a scene (for a default or given viewing perspective) can be determined. The comparative distance and position of the objects can be calculated based on a baseline distance configured in the video analysis engine, the baseline distance being to the position from which the video is captured (e.g. a camera position). Referring to FIG. 1, the distance between the horse 102 and birds 104 can be determined from measurements made by the camera or other devices.

Additionally or alternatively, the intensity of sound from an object can be determined during playback of the video. The above information may be used in the event that the user zooms to new position A, which we might assume is halfway between the horse 102 and the birds 104. Regardless of the viewing perspective that the user chooses (how far the user zooms, the angle from which the user views the scene, etc.), the distance between the objects and the new viewing perspective's position may be determined. Thus, while the video is being played, software can play the audio appropriate audio portions from each of the audio layers and the audio volume level for each of those portions may be automatically determined based on comparative distances between the objects.

Referring back to FIG. 3, the device displaying the multimedia content, or another device, can track a user's interaction with the content (310) to detect whether a different viewing perspective is selected (312). If not, the process determines (314) whether to end (for instance whether the multimedia content is still playing) and ends if so (314, Y). If it is determined not to end (314, N), the process returns to 310 to continue tracking the user's interaction. Returning to 312, upon detecting selection of a different viewing perspective (such as a change in zoom or selection of a different viewing angle as examples), the process returns to 308 to re-adjust the volume of the audio portions based on the distances. In this regard, the video analysis engine can identify the object(s) being viewed in the newly-selected viewing perspective as well as the changes in comparative distance, and accordingly can apply adjustments (filter-out, mute, volume-adjust, etc.) one or more audio portions accordingly. In a specific example where a user navigates from one video feed to another video feed in a multi-view video, software can calculate new comparative distance(s) and position(s) of the objects shown in the selected view and accordingly determine the audio mix to include the proper audio portions at the proper audio volume levels.

Described herein are aspects of perspective-based dynamic audio volume adjustment. Video analysis software, such as that installed on a computer system of, or in communication with, a television or other display device, can identify comparative position and distance of different objects (that generate sound) across video frames, and accordingly calculate a change in comparative position and distance between those objects from one frame to another frame. During Foley activity and/or multimedia playback, a computer system can automatically adjust the loudness factors of the sounds generated by each object based on comparative position and distance of the object.

Video analysis software can track the selected viewing perspective, such as zoom level of the of the video content displayed on a TV screen, and, based on the displayed content for the selected viewing perspective, determine the audio mix of audio portions corresponding to those objects, such as by filtering-out audio content corresponding to objects that are not displayed on the TV screen, and adjusting, automatically, volume levels of the visible objects. Accordingly, sound parameters for different objects may be adjusted based on a zoom level being applied. Zooming-in on content of a video frame changes the position of the user in virtual space relative to the objects displayed, and accordingly the sound parameters (volume, direction, etc.) can also change dynamically. This may be accomplished by applying volume adjustments to captured audio portions, without, for instance, placing microphones at different positions when the video is shot to capture the audio from the different positions.

A video analysis engine or other software can calculate, during post production and/or during playback, resultant volume levels for objects of any video portion based on (i) a number of objects generating a common sound, (ii) actual or inherent loudness of an object generating sound, and/or (iii) comparative distance of the objects.

In multi-video viewing mode and other multiple-view video content, the user may have an option to select a video feed direction from a plurality of available video feed directions. The comparative position and distance of the objects will be changed depending on which video feed direction is selected, and software can dynamically change the loudness of the depicted objects based on their current (i.e. for the selected direction) comparative distances and positions.

Figure 4:
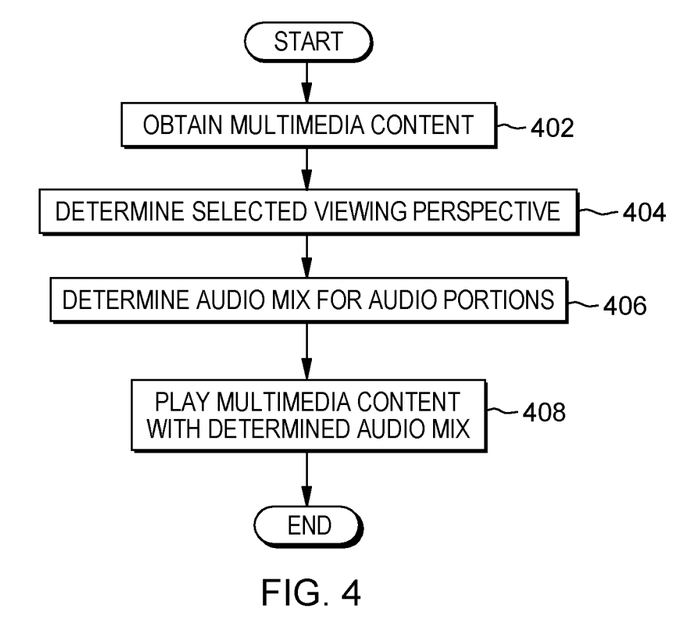
FIG. 4 depicts an example of perspective-based dynamic audio volume adjustment, in accordance with aspects described herein.

FIG. 4 depicts an example of perspective-based dynamic audio volume adjustment in accordance with aspects described herein. In some examples, the process is performed one or more computer systems, such as those described herein, which may include one or more computer systems of or connected to a television or other display device, one or more cloud servers, and/or one of more other computer systems.

The process begins by obtaining multimedia content (402). The multimedia content includes a plurality of video frames of a scene. Multimedia content also includes audio content for playing in conjunction with display of the plurality of video frames. The audio content includes a plurality of audio portions corresponding to a plurality of objects in the scene. The audio portions are sound clips or segments, as examples, and may be stored logically as audio layers. The sound portions can correspond to sounds generated by the objects in the video frames.

The process continues by determining a selected viewing perspective (404) from which to view the scene. A plurality of available viewing perspectives may be available from which users can view the scene, and the selected viewing perspective may be selected automatically and/or based on a user selection from the plurality of available viewing perspectives. Based on a selection of the viewing perspective from which to view the scene and on determining that selected viewing perspective, the process determines an audio mix for the plurality of audio portions (406) given the selected viewing perspective. The determined audio mix can include indications of which audio portions to include in the mix, as well as the volume levels for those audio portions. Thus, determining the audio mix includes determining, for each object of the plurality of objects in the scene, a respective audio volume level for an audio portion, of the plurality of audio portions, corresponding to the object. Each object may have one or more corresponding audio portions, which may be unique to that object. The respective audio volume level may be based at least in part on a position of the object relative to the selected viewing perspective.

In embodiments, determining the audio mix includes determining positions of the plurality of objects relative to each other. This may be made based on object position indications provided as part of the multimedia content or obtained in conjunction with the multimedia content. The multimedia content can therefore further include position information (such as in metadata) indicating positions of the plurality of objects, and the determination of the respective audio volume level for each object of the plurality of objects can use that position information. Positions of the plurality of objects relative to the selected viewing perspective can vary across the plurality of video frames, for instance when objects are moving or when the selected viewing perspective changes position. Determining the respective audio volume level for the audio portion corresponding to each object of the plurality of objects can include determining varying volume levels corresponding to the varying positions of the object across the plurality of video frames.

The determination of the audio volume level for the audio portion corresponding to an object of the plurality of objects may be further based at least in part on the position of the object relative to one or more other objects of the plurality of objects of the scene. In this manner, a distance between objects can affect the respective audio volume levels of the audio produced by those objects.

Determining the audio volume level for an audio portion corresponding to an object of the plurality of objects may be further based at least in part on a number of sub-objects, of the object, generating the sound. In some examples, the object is composed of or includes several items contributing to the sound generated by the object. The object may be a group of animals, for instance. In these cases, the volume level of the audio portion corresponding to the object can be based on the number of contributing sub-objects. Generally, more sub-objects will imply a louder audio volume.

Determining the audio volume level for the audio portion corresponding to an object of the plurality of objects may be further based at least in part on a baseline or inherent loudness of the object. A running train is inherently louder than a bird when positioned at a same distance from the listener. Consequently, an object's inherent loudness (e.g. X decibels at a distance of Y meters) can serve as a factor in determining how loud an object should be in the audio mix relative to other objects.

The process of FIG. 4 continues by playing the multimedia content with the determined audio mix (408), during which each audio portion of the plurality of audio portions is played with the determined audio volume level for that portion.

The selected viewing perspective can include or be a selected zoomed-in perspective of the plurality of video frames. The zoomed-in perspective can simulate a closer distance (e.g. FIG. 2) to one or more objects of the plurality of objects than a full-frame (e.g. FIG. 1) perspective of the plurality of video frames. Consequently, the audio volume level for the audio portions corresponding to the one or more objects, to which the closer distance is simulated by the zoomed-in perspective, may be increased based on selecting the zoomed-in perspective.

Based on selecting the zoomed-in perspective, at least one object of the plurality of objects may no longer be within view on a display on which the multimedia content is to be played. In these examples, determining the audio mix may filter-out at least one audio portion, corresponding to the at least one object, of the plurality of audio portions. In the filtering, the audio volume level of the at least one audio portion may be silenced or omitted from the audio mix.

The multimedia content can include multiple-view video content providing multiple selectable viewing angles from which to view the scene. The selected viewing perspective in this case may be a selected viewing angle of the multiple selectable viewing angles. The multiple selectable viewing angles may each be from a unique position relative to the plurality of objects of the scene and have a corresponding unique set of distances between the unique position and the plurality of objects of the scene. In other words, for any given perspective, the distances from the position of the viewing perspective to the objects, as well as the objects' locations relative to the position of the viewing perspective, will be different from those of another viewing perspective. The determined audio mix may therefore be based on the set of distances between the unique position of the selected viewing angle and the plurality of objects of the scene. Based on which viewing angle is selected, the audio mix may be based on the distances to the different objects from that that viewing angle. Some objects in the foreground may be in the very distance background from one perspective. From another, more distant, perspective, the objects may be equally far away from the viewer.

Although various examples are provided, variations are possible without departing from a spirit of the claimed aspects.

Figure 5:
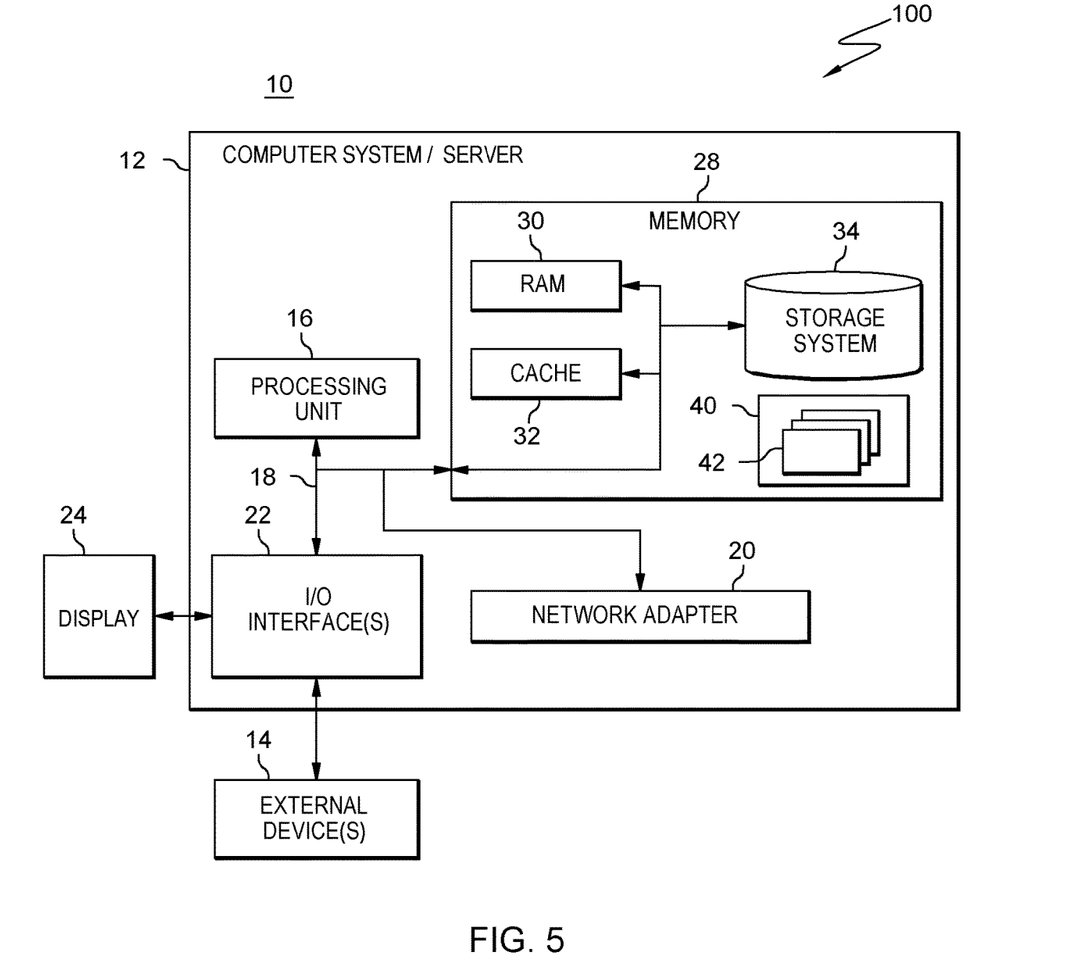
FIG. 5 depicts one example of a computer system and associated devices to incorporate and/or use aspects described herein.

Processes described herein may be performed singly or collectively by one or more computer systems, such as one or more television or other display devices, cable boxes, tuner boxes, or the like, one or more cloud servers or backend computers, or a combination of the foregoing. FIG. 5 depicts one example of such a computer system and associated devices to incorporate and/or use aspects described herein. A computer system may also be referred to herein as a data processing device/system or computing device/system/node, or simply a computer. The computer system may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

As shown in FIG. 5, a computing environment 500 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, workstations, laptops, handheld devices, mobile devices/computers such as smartphones, tablets, and wearable devices, multiprocessor systems, microprocessor-based systems, telephony device, network appliance (such as an edge appliance), virtualization device, storage controllers, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 is shown in the form of a general-purpose computing device. The components of computer system/server 12 may include, but are not limited to, one or more processors or processing units 16, a system memory 28, and a bus 18 that couples together various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media such as erasable programmable read-only memory (EPROM or Flash memory). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more computer application programs, other program modules, and program data. Computer programs may execute to perform aspects described herein. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Input/Output (I/O) devices (including but not limited to microphones, speakers, accelerometers, gyroscopes, magnetometers, sensor devices configured to sense light, proximity, heart rate, body and/or ambient temperature, blood pressure, and/or skin resistance, activity monitors, GPS devices, cameras, etc.) may be coupled to the system either directly or through I/O interfaces 22. Still yet, computer system/server 12 may be able to communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter(s) may also enable the computer system to become coupled to other computer systems, storage devices, or the like through intervening private or public networks. Ethernet-based (such as Wi-Fi) interfaces and Bluetooth® adapters are just examples of the currently available types of network adapters used in computer systems.

It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 5.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
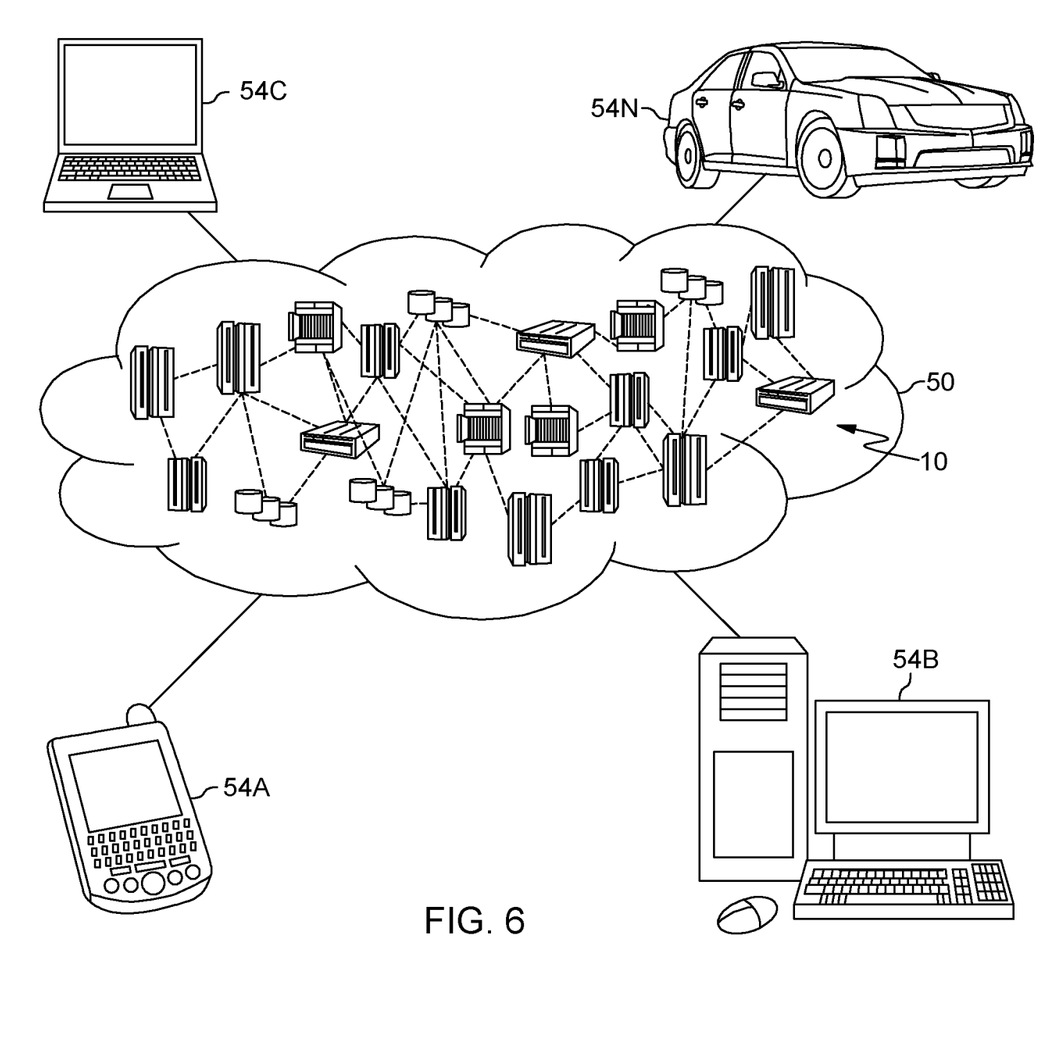
FIG. 6 depicts one embodiment of a cloud computing environment.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
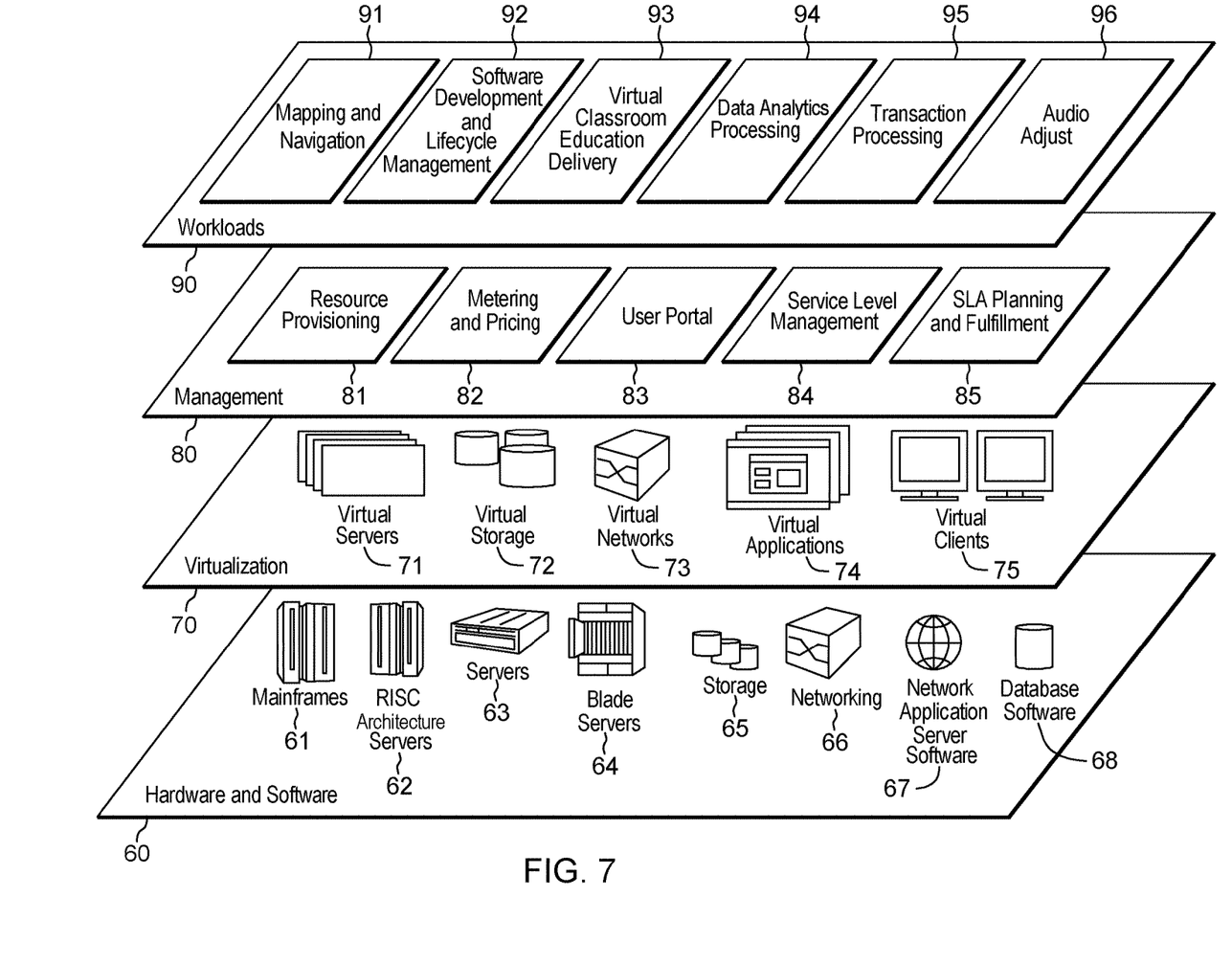
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio adjustment processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining multimedia content comprising (i) a plurality of video frames of a scene, the plurality of video frames of the scene captured by a camera, (ii) audio content for playing in conjunction with display of the plurality of video frames, the audio content comprising a plurality of audio portions corresponding to a plurality of objects in the scene, and (iii) an indication of a distance between the camera and an object of the plurality of objects in the scene; and
   based on a user selection of a viewing perspective from which the user is to view the scene, the selection made from a plurality of available viewing perspectives available from which to view the scene and each of the plurality of available viewing perspectives having a unique set of distances from the plurality of objects in the scene, determining an audio mix for the plurality of audio portions given the selected viewing perspective, the selected viewing perspective being a perspective of the camera, the determining the audio mix comprising determining an audio volume level for an audio portion, of the plurality of audio portions, corresponding to the object, the determining the audio volume level being based at least in part on the distance between the camera and the object, and the determining the audio volume level being further based at least in part on a number of sub-objects, of the object, generating the sound, wherein a greater number of the sub-objects results in a louder audio volume level than does a lesser number of the sub-objects.

2. The method of claim 1, wherein determining the audio volume level for the audio portion corresponding to the object of the plurality of objects is further based at least in part on a baseline loudness for the object at a given distance.

3. The method of claim 2, wherein the baseline loudness is determined from a knowledgebase.

4. The method of claim 1, wherein the determining the audio mix further comprises determining positions of the plurality of objects relative to each other, and wherein the determining the audio volume level for the audio portion corresponding to the object of the plurality of objects is further based at least in part on the position of the object relative to one or more other objects of the plurality of objects of the scene.

5. The method of claim 1, wherein the multimedia content further comprises angular position information indicating angular positions of the plurality of objects, and wherein the determining the audio volume level for the audio portion corresponding to the object of the plurality of objects uses the angular position information.

6. The method of claim 1, further comprising determining the audio mix for the plurality of audio portions based on the user selecting a zoomed-in perspective of the plurality of video frames, the zoomed-in perspective being zoomed-in from the perspective of the camera and providing a partial-frame perspective of the plurality of video frames that simulates a closer distance to one or more objects of the plurality of objects than a full-frame perspective of the plurality of video frames, wherein the audio volume level for the audio portion corresponding to the object is increased based on selecting the zoomed-in perspective.

7. The method of claim 6, wherein based on selecting the zoomed-in perspective, at least one object of the plurality of objects is not within view on a display on which the multimedia content is to be played, and wherein determining the audio mix based on the user selecting the zoomed-in perspective filters-out at least one audio portion, corresponding to the at least one object, of the plurality of audio portions, in which the audio volume level of the at least one audio portion is silenced or the at least one audio portion is omitted from the audio mix.

8. The method of claim 1, wherein the multimedia content comprises multiple-view video content providing multiple selectable viewing angles from which to view the scene, the multiple selectable viewing angles each being from a unique position relative to the plurality of objects of the scene and corresponding to a respective available viewing perspective of the plurality of available viewing perspectives, the unique set of distances from the objects of the scene being a unique set of distances between the unique position and the plurality of objects of the scene, wherein the selected viewing perspective is a selected viewing angle of the multiple selectable viewing angles and the determined audio mix is based on the set of distances between the unique position of the selected viewing angle and the plurality of objects of the scene.

9. The method of claim 1, wherein positions of the plurality of objects relative to the selected viewing perspective vary across the plurality of video frames, and wherein determining the audio volume level for the audio portion corresponding to the object of the plurality of objects comprises determining varying volume levels corresponding to the varying positions of the object across the plurality of video frames.

10. A computer program product comprising:
    a computer readable storage medium readable by a hardware processor and storing instructions for execution by the hardware processor for performing a method comprising:
       obtaining multimedia content comprising (i) a plurality of video frames of a scene, the plurality of video frames of the scene captured by a camera, (ii) audio content for playing in conjunction with display of the plurality of video frames, the audio content comprising a plurality of audio portions corresponding to a plurality of objects in the scene, and (iii) an indication of a distance between the camera and an object of the plurality of objects in the scene; and
       based on a user selection of a viewing perspective from which the user is to view the scene, the selection made from a plurality of available viewing perspectives available from which to view the scene and each of the plurality of available viewing perspectives having a unique set of distances from the plurality of objects in the scene, determining an audio mix for the plurality of audio portions given the selected viewing perspective, the selected viewing perspective being a perspective of the camera, the determining the audio mix comprising determining an audio volume level for an audio portion, of the plurality of audio portions, corresponding to the object, the determining the audio volume level being based at least in part on the distance between the camera and the object, and the determining the audio volume level being further based at least in part on a number of sub-objects, of the object, generating the sound, wherein a greater number of the sub-objects results in a louder audio volume level than does a lesser number of the sub-objects.

11. The computer program product of claim 10, wherein determining the audio volume level for the audio portion corresponding to the object of the plurality of objects is further based at least in part on a baseline loudness for the object at a given distance.

12. The computer program product of claim 11, wherein the baseline loudness is determined from a knowledgebase.

13. The computer program product of claim 10, wherein the determining the audio mix further comprises determining positions of the plurality of objects relative to each other, and wherein the determining the audio volume level for the audio portion corresponding to the object of the plurality of objects is further based at least in part on the position of the object relative to one or more other objects of the plurality of objects of the scene.

14. The computer program product of claim 10, wherein the method further comprises determining the audio mix for the plurality of audio portions based on the user selecting a zoomed-in perspective of the plurality of video frames, the zoomed-in perspective being zoomed-in from the perspective of the camera and providing a partial-frame perspective of the plurality of video frames that simulates a closer distance to one or more objects of the plurality of objects than a full-frame perspective of the plurality of video frames, wherein the audio volume level for the audio portion corresponding to the object is increased based on selecting the zoomed-in perspective.

15. The computer program product of claim 14, wherein based on selecting the zoomed-in perspective, at least one object of the plurality of objects is not within view on a display on which the multimedia content is to be played, and wherein determining the audio mix based on the user selecting the zoomed-in perspective filters-out at least one audio portion, corresponding to the at least one object, of the plurality of audio portions, in which the audio volume level of the at least one audio portion is silenced or the at least one audio portion is omitted from the audio mix.

16. A computer system comprising:
a memory; and
a processor in communication with the memory, wherein the computer system is configured to perform a method, the method comprising:
obtaining multimedia content comprising (i) a plurality of video frames of a scene, the plurality of video frames of the scene captured by a camera, (ii) audio content for playing in conjunction with display of the plurality of video frames, the audio content comprising a plurality of audio portions corresponding to a plurality of objects in the scene, and (iii) an indication of a distance between the camera and an object of the plurality of objects in the scene; and
based on a user selection of a viewing perspective from which the user is to view the scene, the selection made from a plurality of available viewing perspectives available from which to view the scene and each of the plurality of available viewing perspectives having a unique set of distances from the plurality of objects in the scene, determining an audio mix for the plurality of audio portions given the selected viewing perspective, the selected viewing perspective being a perspective of the camera, the determining the audio mix comprising determining an audio volume level for an audio portion, of the plurality of audio portions, corresponding to the object, the determining the audio volume level being based at least in part on the distance between the camera and the object, and the determining the audio volume level being further based at least in part on a number of sub-objects, of the object, generating the sound, wherein a greater number of the sub-objects results in a louder audio volume level than does a lesser number of the sub-objects.

17. The computer system of claim 16, wherein determining the audio volume level for the audio portion corresponding to the object of the plurality of objects is further based at least in part on a baseline loudness for the object at a given distance.

18. The computer system of claim 17, wherein the baseline loudness is determined from a knowledgebase.

19. The computer system of claim 16, wherein the method further comprises determining the audio mix for the plurality of audio portions based on the user selecting a zoomed-in perspective of the plurality of video frames, the zoomed-in perspective being zoomed-in from the perspective of the camera and providing a partial-frame perspective of the plurality of video frames that simulates a closer distance to one or more objects of the plurality of objects than a full-frame perspective of the plurality of video frames, wherein the audio volume level for the audio portion corresponding to the object is increased based on selecting the zoomed-in perspective, and wherein, based on selecting the zoomed-in perspective, at least one object of the plurality of objects is not within view on a display on which the multimedia content is to be played, and wherein determining the audio mix based on the user selecting the zoomed-in perspective filters-out at least one audio portion, corresponding to the at least one object, of the plurality of audio portions, in which the audio volume level of the at least one audio portion is silenced or the at least one audio portion is omitted from the audio mix.

* * * * *